(12) United States Patent
Wang et al.

(10) Patent No.: US 11,734,622 B2
(45) Date of Patent: Aug. 22, 2023

(54) METHOD, APPARATUS AND DEVICE FOR DETERMINING PRODUCTION CAPACITY BOUNDARIES

(71) Applicant: CHANGXIN MEMORY TECHNOLOGIES, INC., Hefei (CN)

(72) Inventors: Jianping Wang, Hefei (CN); Xiao Wang, Hefei (CN); Jinjin Cao, Hefei (CN)

(73) Assignee: CHANGXIN MEMORY TECHNOLOGIES, INC., Anhui (CN)

( * ) Notice: Subject to any disclaimer, the term of this patent is extended or adjusted under 35 U.S.C. 154(b) by 128 days.

(21) Appl. No.: 17/396,899

(22) Filed: Aug. 9, 2021

(65) Prior Publication Data

US 2022/0383214 A1 Dec. 1, 2022

Related U.S. Application Data

(63) Continuation of application No. PCT/CN2021/101251, filed on Jun. 21, 2021.

(30) Foreign Application Priority Data

May 27, 2021 (CN) .......................... 202110606463.2

(51) Int. Cl.
*G06Q 10/0631* (2023.01)
*G06Q 50/04* (2012.01)
(Continued)

(52) U.S. Cl.
CPC ..... *G06Q 10/0631* (2013.01); *G06Q 10/0633* (2013.01); *G06Q 10/06375* (2013.01); *G06Q 50/04* (2013.01)

(58) Field of Classification Search
CPC .......................................... G06Q 10/00–50/00
(Continued)

(56) References Cited

U.S. PATENT DOCUMENTS 5,950,170 A * 9/1999 Pan ................... G06Q 10/06312
700/121
7,142,937 B1 * 11/2006 Chin .................. G06Q 10/0631
700/121
(Continued)

FOREIGN PATENT DOCUMENTS

CN 100383684 C 4/2008
CN 108764741 B 10/2019

OTHER PUBLICATIONS

Chien, Chen-Fu, Chia-Yu Hsu, and Chih-Wei Hsiao. "Manufacturing intelligence to forecast and reduce semiconductor cycle time." Journal of Intelligent Manufacturing 23 (2012): 2281-2294. (Year: 2012).*

(Continued)

*Primary Examiner* — Alan S Miller
(74) *Attorney, Agent, or Firm* — Cooper Legal Group, LLC

(57) ABSTRACT

A method, apparatus and device for determining production capacity boundaries are provided. In the method, related data for producing a run size of elements by a production device lot by lot is acquired and time intervals between production ending time points of adjacent lots are determined according to the related data; the determined time intervals are sorted to obtain a time interval sequence; distribution features of time intervals at two boundaries are parsed respectively to determine whether a data removing condition is satisfied; if Yes, an outlier is determined according to a mean value of the present time interval sequence, the time interval of the extraction step length where the outlier is located is removed, and whether the data removing condition is satisfied is determined; and if No, production capacity boundaries are determined according to minimum (Continued)

and maximum time intervals of the present time interval sequence and the run size.

20 Claims, 3 Drawing Sheets

(51) Int. Cl.
*G06Q 10/0637* (2023.01)
*G06Q 10/0633* (2023.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 8,126,574 | B2* | 2/2012 | Discenzo | G06Q 10/04 700/28 |
| 2001/0037282 | A1* | 11/2001 | Yoneda | G06Q 40/04 705/37 |
| 2002/0198757 | A1* | 12/2002 | Hegde | G06Q 10/087 705/7.22 |
| 2006/0259173 | A1* | 11/2006 | Chin | G05B 19/41865 700/99 |
| 2019/0347593 | A1* | 11/2019 | Norman | G06Q 10/06311 |

OTHER PUBLICATIONS

Tyan, Jonah C., James C. Chen, and Fu-Kwun Wang. "Development of a state-dependent dispatch rule using theory of constraints in near-real-world wafer fabrication." Production Planning & Control 13.3 (2002): 253-261. (Year: 2002).*

Chien, Chen-Fu, and Chien-Hung Chen. "A novel timetabling algorithm for a furnace process for semiconductor fabrication with constrained waiting and frequency-based setups." OR Spectrum 29 (2007): 391-419. (Year: 2007).*

Lee, Jun-Ho, Sun Hoon Kim, and Young Hoon Lee. "Discrete lot sizing and scheduling problem under batch processing constraints in the semiconductor manufacturing." The International Journal of Advanced Manufacturing Technology 69 (2013): 383-396. (Year: 2013).*

* cited by examiner

METHOD, APPARATUS AND DEVICE FOR DETERMINING PRODUCTION CAPACITY BOUNDARIES

CROSS-REFERENCE TO RELATED APPLICATION

The present application is continuation of International Patent Application No. PCT/CN2021/101251, filed on Jun. 21, 2021, which claims priority to Chinese Patent Application No. 202110606463.2, filed to the China National Intellectual Property Administration on May 27, 2021 and entitled "Method, Apparatus and Device for Determining Production Capacity Boundaries". The disclosures of International Patent Application No. PCT/CN2021/101251 and Chinese Patent Application No. 202110606463.2 are hereby incorporated by reference in their entireties.

BACKGROUND

At present, in the field of semiconductor manufacturing, when a device is fully loaded and runs stably, for a determined device and a determined recipe, a production capacity of the device is usually measured by Wafer Per Hour (WPH). Herein, WPH=Run Size/Takt Time. Run Size represents the number of wafers produced in each lot, and this value is determined when the device is fully loaded and runs stably. Takt Time represents a time interval between ending time of production of two adjacent lots. Therefore, when the device is fully loaded and runs stably, the production capacity of the device is determined by the Takt Time.

When the device is fully loaded and runs stably, there are upper and lower boundaries for the Takt Time, so that there are upper and lower boundaries for the production capacity of the device. In addition, one of capacity planning tasks in the field of semiconductor manufacturing is to plan the number of production devices according to a capacity extension requirement, estimate required production resources according to the planned number of the production devices, and make preparations for production, while the number of the production devices is mainly determined by the production capacity of the device, so that the production capacity of the device may indirectly affect capacity planning. A semiconductor manufacturing process is complex in flow and dynamically variable in production line state, and determining a production capacity boundary of the device accurately may provide a firm decision-making basis for capacity planning and improve the decision-making efficiency.

For determining the production capacity boundary of the device accurately, Takt Time data is required to be processed correctly. At present, a normal distribution algorithm is mainly adopted to process the Takt Time data. The normal distribution algorithm estimates a mean value based on multiple pieces of Takt Time corresponding to multiple lots respectively to determine final Takt Time, which may describe a mean level roughly only, is not so accurate, may not estimate the production capacity boundary of the device, and thus may deviate capacity planning and greatly affect preparatory work for production.

Therefore, it is necessary to provide a solution capable of accurately estimating a production capacity boundary of a device.

SUMMARY

The present disclosure relates to the field of semiconductor manufacturing, and particularly to a method, apparatus and device for determining production capacity boundaries.

According to a first aspect, the present disclosure provides a method for determining production capacity boundaries, which may include the following operations. Related data for producing a run size of elements by a production device lot by lot is acquired, and time intervals between production ending time points of adjacent lots are determined according to the related data. The determined time intervals are sorted according to lengths to obtain a time interval sequence. Distribution features of time intervals at two boundaries of a present time interval sequence are parsed respectively to determine whether a data removing condition is satisfied, the time intervals at each boundary being time intervals of two extraction step lengths. When the data removing condition is satisfied, an outlier in the parsed time intervals is determined according to a mean value of the present time interval sequence, the time interval of the extraction step length where the outlier is located is removed, and the distribution features of the time intervals at the two boundaries of the present time interval sequence are re-parsed respectively to determine whether the data removing condition is satisfied. When the data removing condition is not satisfied, production capacity boundaries of the production device are determined according to a minimum time interval and maximum time interval of the present time interval sequence and the run size.

According to a second aspect, the present disclosure provides an apparatus for determining production capacity boundaries, comprising: a memory for storing processor-executable instructions; and a processor configured to execute the processor-executable instructions to: acquire related data for producing a run size of elements by a production device lot by lot, and determine time intervals between production ending time points of adjacent lots according to the related data; sort the determined time intervals according to lengths to obtain a time interval sequence; parse distribution features of time intervals at two boundaries of a present time interval sequence respectively to determine whether a data removing condition is satisfied, the time intervals at each boundary being time intervals of two extraction step lengths; when the data removing condition is satisfied, determine an outlier in the parsed time intervals according to a mean value of the present time interval sequence, remove the time interval of the extraction step length where the outlier is located, and re-parse the distribution features of the time intervals at the two boundaries of the present time interval sequence respectively to determine whether the data removing condition is satisfied; and when the data removing condition is not satisfied, determine a production capacity boundary of the production device according to a minimum time interval and maximum time interval of the present time interval sequence and the run size.

According to a third aspect, the present disclosure provides non-transitory computer-readable storage medium having stored a computer program instruction that when executed by a processor, implements the steps of a method for determining production capacity boundaries, the method comprising: acquiring related data for producing a run size of elements by a production device lot by lot, and determining time intervals between production ending time points of adjacent lots according to the related data; sorting the determined time intervals according to lengths to obtain a time interval sequence; parsing distribution features of time intervals at two boundaries of a present time interval sequence respectively to determine whether a data removing condition is satisfied, the time intervals at each boundary being time intervals of two extraction step lengths; when the data removing condition is satisfied, determining an outlier in the parsed time intervals according to a mean value of the present time interval sequence, removing the time interval of the extraction step length where the outlier is located, and re-parsing the distribution features of the time intervals at the two boundaries of the present time interval sequence respectively to determine whether the data removing condition is satisfied; and when the data removing condition is not satisfied, determining production capacity boundaries of the production device according to a minimum time interval and maximum time interval of the present time interval sequence and the run size.

DETAILED DESCRIPTION

In order to enable those skilled in the art to understand the technical solutions of the present disclosure better, the technical solutions in the embodiments of the present disclosure will be described clearly and completely below in conjunction with the drawings in the embodiments of the present disclosure.

It is to be noted that terms "first", "second", and the like in the specification, claims, and drawings of the disclosure are adopted not to describe a specific sequence or order but to distinguish similar objects. It should be understood that data used like this may be interchanged as appropriate such that the embodiments of the disclosure described here may be implemented, for example, according to sequences in addition to those illustrated or described here. Implementations described in the following exemplary embodiments do not represent all implementations consistent with the disclosure. Instead, they are merely examples of an apparatus and method consistent with some aspects of the disclosure described in detail in the appended claims. All other embodiments obtained by those of ordinary skill in the art based on the embodiments in the present disclosure without creative work shall fall within the scope of protection of the present disclosure.

In the description of the embodiments of the present disclosure, "/" means OR, unless otherwise stated. For example, A/B may represent A or B. As used herein, "and/or" only describes an association relationship of associated objects and represents that there may be three relationships. For example, A and/or B may represent three conditions, i.e., independent existence of A, co-existence of A and B, and independent existence of B. In addition, in the description of the embodiments of the present disclosure, "multiple" refers to two or more than two, and it should be understood that other quantifiers are similar. Preferred embodiments are described here not to limit the present disclosure but only to describe or explain the present disclosure. The embodiments of the present disclosure and features in the embodiments may be combined without conflicts.

In view of the foregoing problems of an existing Takt Time data processing solution, the present disclosure proposes a method for determining production capacity boundaries, apparatus and device.

The method for determining production capacity boundaries, apparatus and device in the embodiments of the present disclosure will be described below in detail in combination with the drawings.

First Embodiment

Figure 1:
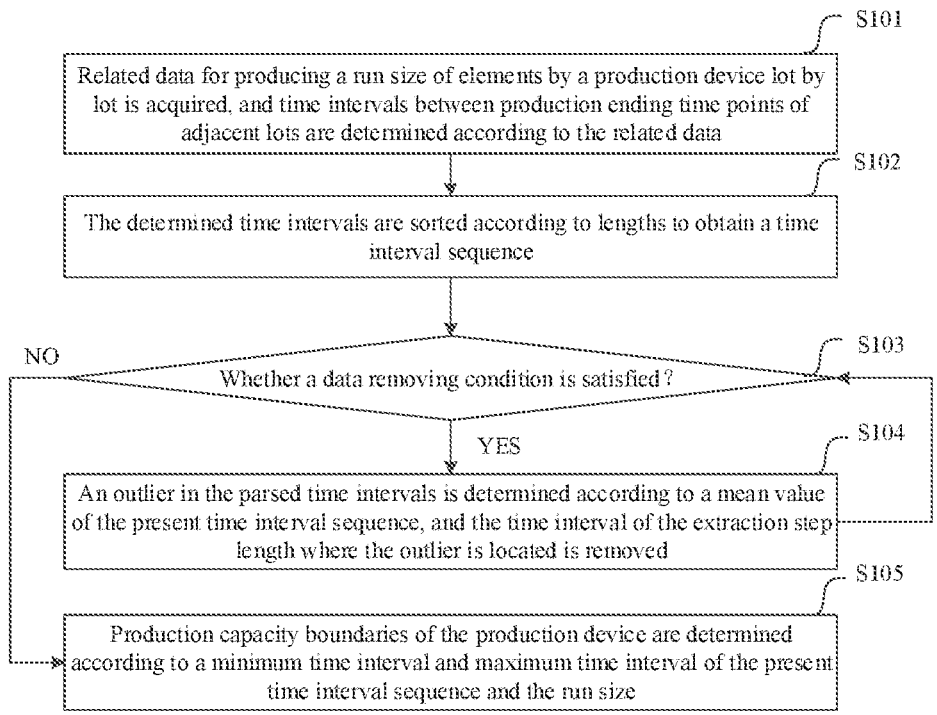
FIG. 1 is a flowchart of a method for determining production capacity boundaries according to an embodiment of the present disclosure.

The embodiment of the present disclosure provides a flowchart of a method for determining production capacity boundaries. As illustrated in FIG. 1, the following operations are included.

In S101, related data for producing a run size of elements by a production device lot by lot is acquired, and time intervals between production ending time points of adjacent lots are determined according to the related data.

As an optional implementation, the elements are semiconductor elements. For the field of semiconductor production, a production capacity boundary of a semiconductor production device is determined.

For a preset production device, the related data for producing the run size of elements by the production device lot by lot is collected during preset manufacture.

In a first implementation, the related data includes time intervals between production ending time points of adjacent lots.

After the related data is acquired, the time intervals between the production ending time of the adjacent lots may be directly acquired from the related data without an additional calculation process.

In a second implementation, the related data includes no time intervals between the production ending time of the adjacent lots but time data for calculating the time intervals between the production ending time of the adjacent lots.

For example, the related data includes the production ending time of each lot, and difference values between the production ending time of the adjacent lots are calculated to determine the time intervals between the production ending time of the adjacent lots.

In addition to the time intervals and the time data for calculating the time intervals between the production ending time of the adjacent lots, the related data may also include other data related to the production device or a production feature, for example, a serial number of the production device, a serial number of the production lot, the number of elements produced in each lot, a production date, a manufacture step, and a lot Identifier (ID).

As illustrated in Table 1, the embodiment of the present disclosure provides a schematic table of the related data.

TABLE 1

Schematic Table of Related Data

| Serial number of the lot | Production date | Manufacture step | Lot ID | Time interval |
|---|---|---|---|---|
| 1 | 2021 Feb. 13 | stepA | LOTID01 | 0.4734133 |
| 2 | 2021 Feb. 13 | stepA | LOTID02 | 0.474172981 |

TABLE 1-continued

Schematic Table of Related Data

| Serial number of the lot | Production date | Manufacture step | Lot ID | Time interval |
|---|---|---|---|---|
| 3 | 2021 Apr. 2 | stepA | LOTID03 | 0.4749274 |
| 4 | 2021 Mar. 7 | stepA | LOTID04 | 0.475526094 |
| 5 | 2021 Feb. 13 | stepA | LOTID05 | 0.476584597 |
| 6 | 2021 Mar. 8 | stepA | LOTID06 | 0.477191708 |
| 7 | 2021 Jan. 23 | stepA | LOTID07 | 0.477642044 |
| 8 | | | LOWER | 0.477993592 |
| 9 | 2021 Mar. 9 | stepA | LOTID07 | 0.478096592 |
| 10 | 2021 Mar. 8 | stepA | LOTID08 | 0.479608586 |
| 11 | 2021 Jan. 23 | stepA | LOTID09 | 0.480202019 |
| 12 | 2021 Jan. 23 | stepA | LOTID10 | 0.480509258 |
| 13 | 2021 Feb. 12 | stepA | LOTID11 | 0.480811236 |
| 14 | 2021 Jan. 23 | stepA | LOTID12 | 0.480962753 |
| 15 | 2021 Feb. 8 | stepA | LOTID13 | 0.480965908 |
| ... | ... | ... | ... | ... |
| 1675 | | stepA | LOTID1673 | 0.617830242 |
| 1676 | 2021 Jan. 29 | stepA | LOTID1674 | 0.618089225 |
| 1677 | 2021 Mar. 14 | stepA | LOTID1675 | 0.618236533 |
| 1678 | 2021 Feb. 16 | stepA | LOTID1676 | 0.619147728 |
| 1679 | 2021 Mar. 5 | stepA | LOTID1677 | 0.619413931 |
| 1680 | 2021 Apr. 21 | stepA | LOTID1678 | 0.621446758 |
| ... | ... | ... | ... | ... |
| 1705 | 2021 Mar. 17 | stepA | LOTID1703 | 0.973668981 |
| 1706 | 2021 Mar. 17 | stepA | LOTID1704 | 0.974247686 |
| 1707 | 2021 Mar. 18 | stepA | LOTID1705 | 0.979745369 |
| 1708 | 2021 Mar. 21 | stepA | LOTID1706 | 1.006076389 |
| 1709 | 2021 Mar. 21 | stepA | LOTID1707 | 1.013888889 |

Table 1 provides related data of lots 1 to 1,709 when a certain production device produces a run size of elements in lots in stepA.

In S102, the determined time intervals are sorted according to lengths to obtain a time interval sequence.

When time intervals are removed, the time interval corresponding to each lot is taken as an analysis object, and the determined time intervals are sorted.

When the determined time intervals are sorted according to lengths, the determined time intervals may be sorted in an ascending mode according to a sequence from small to large lengths, or may be sorted in a descending mode according to a sequence from large to small lengths.

A specific implementation manner for sorting is not limited in the embodiment of the present disclosure, and any implementation manner capable of sorting the determined time intervals according to the lengths may be applied to the embodiment of the present disclosure. Elaborations are omitted herein.

In S103, distribution features of time intervals at two boundaries of a present time interval sequence are parsed respectively to determine whether a data removing condition is satisfied. When the data removing condition is satisfied, S104 is executed. Otherwise, S105 is executed.

Herein, the time intervals at each boundary are time intervals of two extraction step lengths.

The distribution feature refers to a deviation degree between different time intervals, and may be measured by a difference value between different time intervals.

For improving the data processing efficiency and reducing the calculation burden, the time intervals of the two extraction step lengths are extracted from the two boundaries for distribution feature parsing.

The extraction step length is a number value. For example, when the extraction step length is 1, time intervals of two extraction step lengths are extracted from each boundary in the two boundaries of the present time interval sequence, the time interval of each extraction step length includes one time interval, and distribution features of totally four time intervals are parsed. When the extraction step length is 2, time intervals of two extraction step lengths are extracted from each boundary in the two boundaries of the present time interval sequence, the time interval of each extraction step length includes two time intervals, and distribution features of totally 8 time intervals are parsed. When the extraction step length is 3, time intervals of two extraction step lengths are extracted from each boundary in the two boundaries of the present time interval sequence, the time interval of each extraction step length includes three time intervals, and distribution features of totally 12 time intervals are parsed, and so on.

When the distribution features are parsed, the time interval of each extraction step length is taken as a whole, which, compared with a solution of taking a time interval as a parsing object, has the advantages that a misdetermination in a production capacity boundary value due to a relatively great deviation of a certain piece of data may be avoided and the sensitivity of the determination method for the production capacity boundary value may be reduced.

It is to be noted that, when the data removing condition is satisfied, the time interval is required to be removed, and after the time interval is removed, the total number of time intervals in the present time interval sequence changes, and a specific value of the extraction step length may be adjusted according to a change of the time interval sequence.

In S104, an outlier in the parsed time intervals is determined according to a mean value of the present time interval sequence, the time interval of the extraction step length where the outlier is located is removed, and S103 is executed.

Difference values between the time intervals at the two boundaries of the present time interval sequence and the mean value of the present time interval sequence are calculated, and the time interval corresponding to a maximum difference value is determined as the outlier.

After the outlier is determined, the time interval of the extraction step length where the outlier is located is removed from the present time interval sequence. Removing the time interval according to the extraction step length may reduce the calculation burden and improve the algorithm efficiency.

In a practical running process of the device, existence of some factors such as crash of the device may greatly fluctuate the time interval with the change of the production lot, and such abnormally fluctuating data may not reflect a normal level of the production device. Through the above-mentioned operation, when the data removing condition is satisfied, the time interval of the extraction step length where the outlier is located may be removed to remove the abnormally fluctuating data, improve the accuracy of data processing over the time interval, and ensure the validity of the time interval.

After the time interval is removed, S103 is executed to perform data removing condition determination again. If the data removing condition is still satisfied, time intervals are continued to be removed according to the abovementioned method until the data removing condition is not satisfied. With adoption of the method of cyclically judging whether the data removing condition is satisfied and cyclically performing time interval rejection, the calculation burden may be reduced at the same time of ensuring use of as many time intervals as possible for determination.

In S105, production capacity boundaries of the production device are determined according to a minimum time interval and maximum time interval of the present time interval sequence and the run size.

A ratio of the run size to the minimum time interval of the present time interval sequence and a ratio of the run size to the maximum time interval of the present time interval sequence are determined as two boundary values of the production capacity boundaries of the production device.

For determining the production capacity boundaries of the production device, it is required that the related data is related data obtained when the production device is fully loaded and in a stable running state, and it is also required that a time interval consistent with a preset data feature may be determined using the related data. Therefore, validity detection is required to be performed on the acquired related data.

After the related data for producing the run size of elements by the production device lot by lot is acquired, whether the related data includes valid data is determined, and when the related data does not include valid data, the related data for producing the run size of elements by the production device lot by lot is reacquired.

The valid data is data acquired when the production device is fully loaded and a running state meets a requirement The requirement that the running state needs to meet may specifically be limited according to a practical implementation condition. For example, the running state is set to the stable running state. Specifically, when the production device machines and produces the elements, no accidents caused by own factors of the device such as crash of the device and accidents caused by environmental factors such as outage and a power failure happen.

Through validity detection, it is determined that the acquired related data includes the valid data acquired when the production device is fully loaded and the running state meets the requirement, and if the related data does not include the valid data, the related data for producing the run size of elements by the production device lot by lot is reacquired.

It is to be noted that, when the related data for producing the run size of elements by the production device lot by lot is reacquired, a data acquisition range of the related data may be extended or changed to obtain the valid data.

During data acquisition for the related data, related data of production of different run sizes in each slot by different production devices in different manufacture steps may be acquired. Therefore, during data acquisition, it is necessary to perform data validity detection and remove invalid data.

Whether a time interval inconsistent with a predefined data feature may be determined according to the related data is determined.

If a time interval inconsistent with a predefined data feature may be determined according to the related data, related data according to which the time interval inconsistent with the predefined data feature may be determined is removed.

The predefined data feature may specifically be set according to a specific implementation condition. For example, a device number of the production device is a preset device number, and the number of elements produced in the time interval is a preset run size. No limits are made thereto in the embodiment of the present disclosure.

Since a semiconductor manufacturing process is extremely precise, a time interval, i.e., Takt Time, between production ending time of adjacent lots is theoretically represented in two forms. (1) The Takt Time is controlled by a clock in the device (processed controlled by clock), and for a determined recipe, the Takt Time is a constant. In such case, a relationship between Takt Time and a manufacture lot may be described with a horizontal linear functional relationship. (2) The Takt Time is controlled by an advanced process control system in the device (process controlled by advanced process control), and a key parameter of the manufacturing process is fed back in a data acquisition process to continuously correct related data of the Takt Time. In such case, the relationship between the Takt Time and the manufacture lot may be described with a linear functional relationship.

The method, apparatus and device for determining production capacity boundaries provided in the present disclosure have the following beneficial effects.

The concept of production capacity boundary of production device is proposed for the first time. Data removing condition determination is performed on the time intervals between the production ending time of the adjacent lots, and when the data removing condition is satisfied, the time interval of the extraction step length where the outlier is located is removed. In such a manner, data processing is performed accurately on the time intervals to obtain the time intervals that reflect a production capacity of the production device. A specific method is provided to determine the production capacity of the production device according to the determined time intervals. The accuracy and decision-making efficiency of capacity planning may be improved, an implementation effect of preparatory work for production may be improved, and production resource wastes may be reduced.

Figure 2:
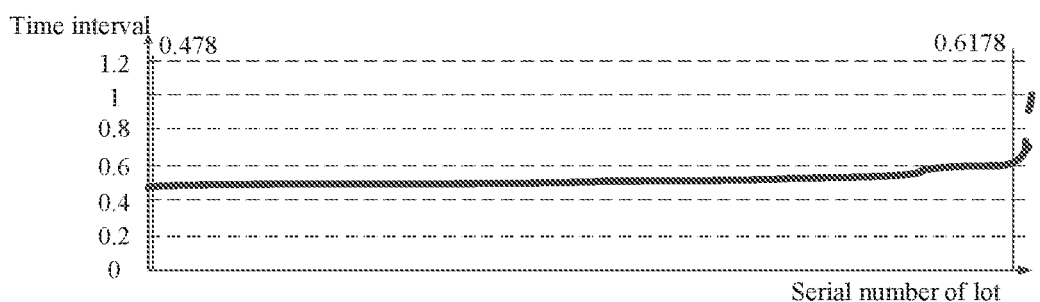
FIG. 2 is a schematic diagram of a linear functional relationship between serial numbers of lots and determined time intervals according to an embodiment of the present disclosure.

As illustrated in FIG. 2, the embodiment of the present disclosure provides a schematic diagram of a linear functional relationship between a serial number of each lot and a determined time interval.

FIG. 2 is a schematic diagram made according to the data in Table 1. The abscissa is the serial number of each lot, and the ordinary is the time interval.

It can be seen from FIG. 2 that, in an ordinate range [0.478, 0.6178], the time interval changes but changes relatively gently, differences between data are relatively small, and the time interval presents a linear functional distribution feature; and in an ordinate range of less than 0.478 or greater than 0.6178, the time interval changes relatively greatly, is greatly different from the time interval in the range [0.478, 0.6178] and inconsistent with the linear functional distribution feature, is a discrete value, may affect determination of the production capacity boundary, and is required to be removed.

It can be seen from FIG. 2 that discrete values to be removed are at the two boundaries of the time interval sequence. Therefore, the distribution features of the time intervals at the two boundaries of the present time interval sequence may be parsed to determine whether the data removing condition is satisfied, namely whether there is a time interval required to be removed.

After the distribution features of the time intervals at the two boundaries of the present time interval sequence are obtained by parsing, the distribution feature of the time intervals of the two extraction step lengths corresponding to each boundary is compared with the linear functional distribution feature of the present time interval sequence to determine whether the data removing condition is satisfied.

The operation that whether the distribution feature of the time intervals of the two extraction step lengths corresponding to each boundary is consistent with the linear functional distribution feature of the present time interval sequence is specifically implemented as follows.

For a first boundary with shorter time intervals, respective minimum time intervals Min1 and Min2 in two extraction step lengths corresponding to the first boundary are determined respectively, Min1 being not greater than Min2.

For a second boundary with longer time intervals, respective maximum time intervals MaxN−1 and MaxN in two extraction step lengths corresponding to the second boundary are determined respectively, MaxN−1 being not greater than MaxN.

When Min2−Min1<$C_0$*σ, it is determined that a distribution feature of the time intervals of the two extraction step lengths corresponding to the first boundary is consistent with the linear functional distribution feature of the present time interval sequence.

When MaxN−MaxN−1<$C_0$*σ, it is determined that a distribution feature of the time intervals of the two extraction step lengths corresponding to the second boundary is consistent with the linear functional distribution feature of the present time interval sequence.

$C_0$ is a preset tolerance coefficient, and represents an acceptable change degree of the time interval when the production device is fully loaded and in the stable running state. A specific value of $C_0$ may be specifically set according to the practical implementation condition, for example, a practical condition of long-term running of the production device. As an optional implementation, $C_0 \in [0.001, 0.05]$.

σ is a standard deviation of the present time interval sequence, and $$\sigma = \sqrt{\frac{\sum_{i=1}^{n}(t_i - \mu)^2}{n}},$$

where n is the total number of the time intervals of the present time interval sequence, is the mean value of the present time interval sequence, and $t_i$ is an ith time interval in the present time interval sequence.

After whether the distribution feature of the time intervals of the two extraction step lengths corresponding to each boundary is consistent with the linear functional distribution feature of the present time interval sequence is determined, whether the data removing condition is satisfied is determined using the following determination standard.

When the distribution feature of the time intervals of the two extraction step lengths corresponding to any boundary is inconsistent with the linear functional distribution feature of the present time interval sequence, it is determined that the data removing condition is satisfied.

When the distribution feature of the time intervals of the two extraction step lengths corresponding to each boundary is consistent with the linear functional distribution feature of the present time interval sequence, it is determined that the data removing condition is not satisfied.

There is the distribution feature between the time intervals of the two extraction step lengths corresponding to each boundary. When the distribution feature of each boundary is inconsistent with the linear functional distribution feature of the present time interval sequence, it is determined that the data removing condition is satisfied.

According to the linear functional feature of the time interval sequence, the embodiment of the present disclosure provides a data removing condition determination method. When Min2−Min1≥$C_0$*σ or MaxN−MaxN−1≥$C_0$*σ, it is determined that the data removing condition is satisfied, and the time interval of the extraction step length corresponding to the outlier is required to be removed. When Min2−Min1<$C_0$*σ and MaxN−MaxN−1<$C_0$*σ, it is determined that the data removing condition is not satisfied, and a production boundary value may be calculated.

It is to be noted that, since the present time interval sequence is determined by sorting and it is defined that Min1 and Min2 are in the first boundary with the shorter time intervals and MaxN−1 and MaxN are in the second boundary with the longer time intervals, a magnitude relationship between the data is Min1≥Min2≥MaxN−1≥MaxN.

The extraction step length is a ratio of the total number of the time intervals of the present time interval sequence to a preset grouping number N.

A determination manner for the preset grouping number N may specifically be set according to the specific implementation condition. For example, a specific numerical value of the preset grouping number N is determined by testing the data sensitivity of the preset grouping number N. The specific numerical value of the preset grouping number N may specifically be set according to the specific implementation condition. For example, it is set that N≤100.

A determination manner for the time interval of the extraction step length may be determining time intervals of two extraction step lengths only in the two boundaries of the present time interval sequence respectively. For example, time intervals of two extraction step lengths are extracted from the two boundaries of the present time interval sequence respectively. Alternatively, the present time interval sequence may be pooled into N groups, and a first group, second group, (N−1)th group, and Nth group of the two boundaries are determined as time intervals of the extraction step lengths. Herein, the number of time intervals in each of the N groups may be the same or different.

The outlier in the parsed time intervals is determined in the following manner according to the mean value of the present time interval sequence, including the following operations.

The outlier is determined from: (1) the minimum time interval Min1 in the two extraction step lengths corresponding to the first boundary, i.e., the minimum time interval of the present time interval sequence, and (2) the maximum time interval MaxN in the two extraction step lengths corresponding to the second boundary, i.e., the maximum time interval of the present time interval sequence: max{|MaxN−μ|, |Min1−μ|} is determined as the outlier in the parsed time intervals. Herein, p is the mean value of the present time interval sequence.

Differences between each of Min1 and MaxN and the mean value p of the present time interval sequence are calculated respectively, and absolute values are calculated to obtain |Min1−μ| and |MaxN−μ|. When |Min1−μ| is greater than |MaxN−μ|, Min1 is determined as the outlier. When |Min1−μ| is less than |MaxN−μ|, MaxN is determined as the outlier. When |Min1−μ| is equal to |MaxN−μ|, at least one of Min1 and MaxN is determined as the outlier.

After the outlier is determined, the time interval of the extraction step length where the outlier is located is removed from the present time interval sequence as follows. When Min1 is the outlier, the time interval of the extraction step length where Min1 is located is removed. When MaxN is the outlier, the time interval of the extraction step length where MaxN is located is removed.

The production capacity boundaries of the production device are determined in the following manner according to the minimum time interval and maximum time interval of the present time interval sequence and the run size, including the following operation.

In a first implementation, the production capacity boundary WPH∈[Run Size/MaxN, Run Size/Min1] of the production device is determined.

Run Size is the run size, Min1 is the minimum time interval of the present time interval sequence, and MaxN is the maximum time interval of the present time interval sequence.

The run size is compared with Min1 to obtain a relatively high production capacity boundary of the production device. The run size is compared with MaxN to obtain a relatively low production capacity boundary of the production device.

For including a critical value in an analysis range, the calculation method in the first implementation is further improved.

A second implementation: the production capacity boundary WPH∈[Run Size/(M2*MaxN), Run Size/(M1*Min1)] of the production device is determined.

Run Size is the run size, Min1 is the minimum time interval of the present time interval sequence, MaxN is the maximum time interval of the present time interval sequence, M1 is a first preset tolerance coefficient, and M2 is a second preset tolerance coefficient.

The run size is compared with M1*Min1 to obtain the relatively high production capacity boundary of the production device. The run size is compared with M2*MaxN to obtain the relatively low production capacity boundary of the production device.

M1 is a decimal close to 1 and less than 1, and M2 is a decimal close to 1 but greater than 1. Specific numerical values of M1 and M2 may specifically be set according to the specific implementation condition. As an optional implementation, M1 ∈(0.999, 1.0), and M2 ∈(1.0, 1.001)

Valid endpoint data may be included in the analysis range by multiplying Min1 by M1 and multiplying MaxN by M2 to obtain an effective production capacity boundary.

Figure 3:
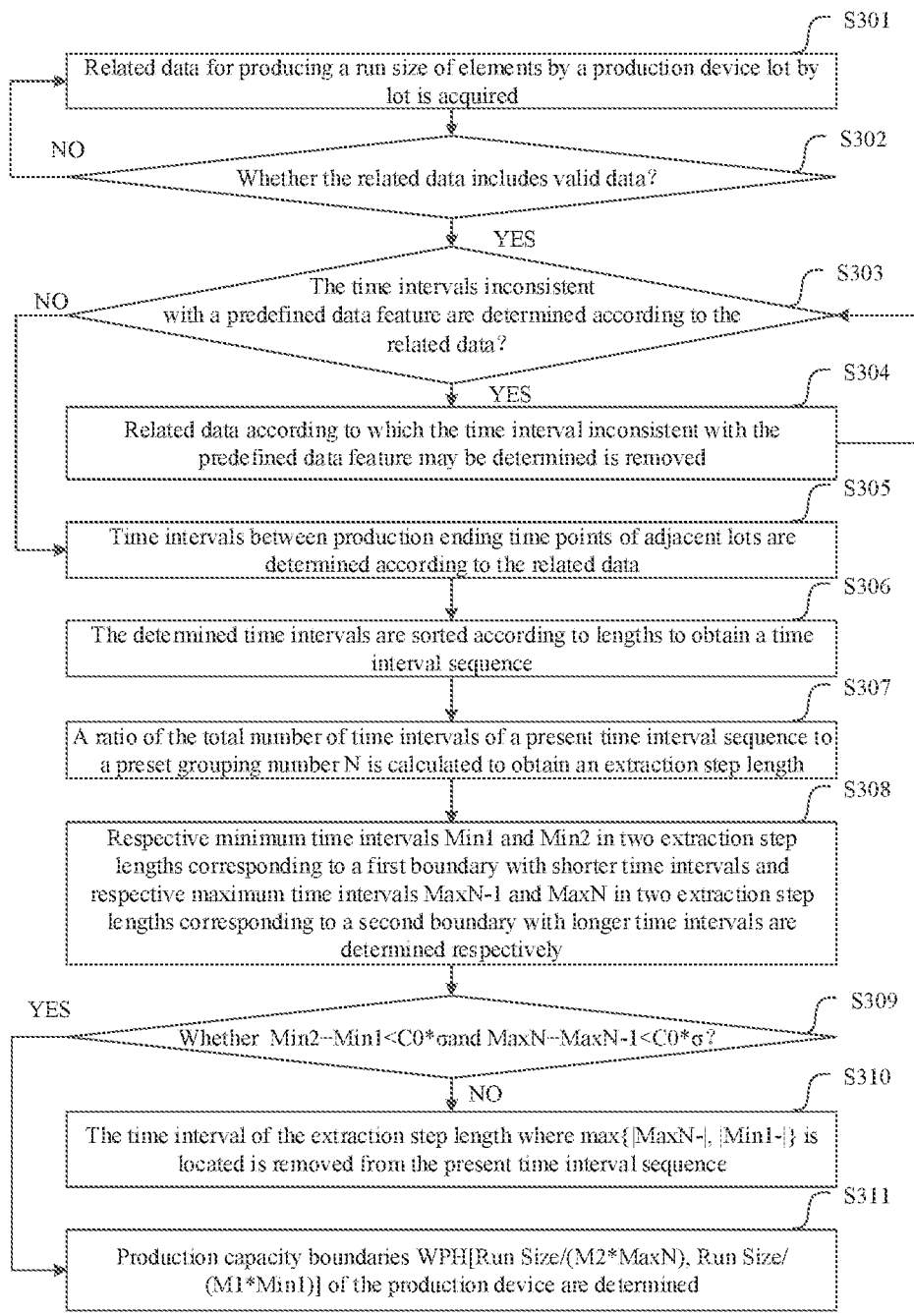
FIG. 3 is a flowchart of an implementation of a method for determining production capacity boundaries according to an embodiment of the present disclosure.

As illustrated in FIG. 3, the embodiment of the present disclosure provides a flowchart of an implementation of a method for determining production capacity boundaries. The following operations are included.

In S301, related data for producing a run size of elements by a production device lot by lot is acquired.

The run size is Run Size.

In S302, whether the related data includes valid data is judged. If YES, S303 is executed. Otherwise, S301 is executed.

The valid data is data acquired when the production device is fully loaded and a running state meets a requirement In S303, whether a time interval inconsistent with a predefined data feature may be determined according to the related data is judged. If YES, S304 is executed. Otherwise, S305 is executed.

In S304, related data according to which the time interval inconsistent with the predefined data feature may be determined is removed, and S303 is executed.

In S305, time intervals between production ending time points of adjacent lots are determined according to the related data.

In S306, the determined time intervals are sorted according to lengths to obtain a time interval sequence.

In S307, a ratio of the total number of time intervals of a present time interval sequence to a preset grouping number N is calculated to obtain an extraction step length.

A specific value of the extraction step length is adjusted according to a change of the total number of the time intervals of the present time interval sequence.

In S308, respective minimum time intervals Min1 and Min2 in two extraction step lengths corresponding to a first boundary with shorter time intervals and respective maximum time intervals MaxN−1 and MaxN in two extraction step lengths corresponding to a second boundary with longer time intervals are determined respectively.

In S309, whether Min, Min2, MaxN−1, and MaxN satisfy conditions Min2−Min1<$C_0$*σ and MaxN−MaxN−1<$C_0$*σ is judged. If YES, S311 is executed. Otherwise, S310 is executed.

$C_0$ is a preset tolerance coefficient, and σ is a standard deviation of the present time interval sequence.

In S310, the time interval of the extraction step length where max{|MaxN−μ|, |Min1−μ|} is located is removed from the present time interval sequence, and S307 is executed.

μ is a mean value of the present time interval sequence.

In S311, a production capacity boundary WPH∈ [Run Size/(M2*MaxN), Run Size/(M1*Min1)] of the production device is determined.

M1 is a first preset tolerance coefficient, and M2 is a second preset tolerance coefficient.

Second Embodiment

Figure 4:
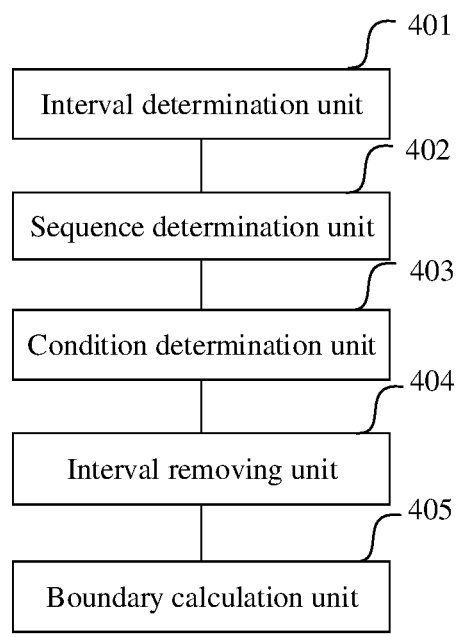
FIG. 4 is a schematic diagram of an apparatus for determining production capacity boundaries according to an embodiment of the present disclosure.

The embodiment of the present disclosure provides a schematic diagram of an apparatus for determining production capacity boundaries. As illustrated in FIG. 4, an interval determination unit 301, a sequence determination unit 402, a condition determination unit 403, an interval removing unit 404, and a boundary calculation unit 405 are included.

The interval determination unit 401 is configured to acquire related data for producing a run size of elements by a production device lot by lot, and determine time intervals between production ending time points of adjacent lots according to the related data.

The sequence determination unit 402 is configured to sort the determined time intervals according to lengths to obtain a time interval sequence.

The condition determination unit 403 is configured to parse distribution features of time intervals at two boundaries of a present time interval sequence respectively to determine whether a data removing condition is satisfied, the time intervals at each boundary being time intervals of two extraction step lengths.

The interval removing unit 404 is configured to, when the data removing condition is satisfied, determine an outlier in the parsed time intervals according to a mean value of the present time interval sequence, remove the time interval of the extraction step length where the outlier is located, and re-parse the distribution features of the time intervals at the two boundaries of the present time interval sequence respectively to determine whether the data removing condition is satisfied.

The boundary calculation unit 405 is configured to, when the data removing condition is not satisfied, determine a production capacity boundary of the production device according to a minimum time interval and maximum time interval of the present time interval sequence and the run size.

Optionally, the operation that the condition determination unit 403 parses the distribution features of the time intervals at the two boundaries of the present time interval sequence respectively to determine whether the data removing condition is satisfied includes the following operations.

Whether the distribution feature of the time intervals of the two extraction step lengths corresponding to each boundary is consistent with a linear functional distribution feature of the present time interval sequence is determined.

When the distribution feature of the time intervals of the two extraction step lengths corresponding to any boundary is inconsistent with the linear functional distribution feature of the present time interval sequence, it is determined that the data removing condition is satisfied.

When the distribution feature of the time intervals of the two extraction step lengths corresponding to each boundary is consistent with the linear functional distribution feature of the present time interval sequence, determining that the data removing condition is not satisfied.

Optionally, the operation that the condition determination unit 403 determines whether the distribution feature of the time intervals of the two extraction step lengths corresponding to each boundary is consistent with the linear functional distribution feature of the present time interval sequence includes the following operations.

For a first boundary with shorter time intervals, respective minimum time intervals Min1 and Min2 in two extraction step lengths corresponding to the first boundary are determined respectively, Min1 being not greater than Min2;

For a second boundary with longer time intervals, respective maximum time intervals MaxN−1 and MaxN in two extraction step lengths corresponding to the second boundary are determined respectively, MaxN−1 being not greater than MaxN.

When Min2−Min1<$C_0$*σ, it is determined that a distribution feature of the time intervals of the two extraction step lengths corresponding to the first boundary is consistent with the linear functional distribution feature of the present time interval sequence.

When MaxN−MaxN−1<$C_0$*σ, it is determined that a distribution feature of the time intervals of the two extraction step lengths corresponding to the second boundary is consistent with the linear functional distribution feature of the present time interval sequence.

$C_0$ is a preset tolerance coefficient, and σ is a standard deviation of the present time interval sequence.

Optionally, the operation that the interval removing unit 404 determines the outlier in the parsed time intervals according to the mean value of the present time interval sequence includes the following operation.

Max{|MaxN−μ|, |Min1−μ|} is determined as the outlier in the parsed time intervals.

Herein, μ is the mean value of the present time interval sequence.

Optionally, the extraction step length is a ratio of the total number of time intervals of the present time interval sequence to a preset grouping number N.

Optionally, the operation that the boundary calculation unit 405 determines the production capacity boundaries of the production device according to the minimum time interval and maximum time interval of the present time interval sequence and the run size includes the following operation.

The production capacity boundary WPH∈[Run Size/(M2*MaxN), Run Size/(M1*Min1)] of the production device is determined.

Run Size is the run size, Min1 is the minimum time interval of the present time interval sequence, MaxN is the maximum time interval of the present time interval sequence, M1 is a first preset tolerance coefficient, and M2 is a second preset tolerance coefficient.

Optionally, after acquiring the related data for producing the run size of elements by the production device lot by lot, the interval determination unit 401 is further configured to:

determine whether the related data includes valid data, the valid data being data acquired when the production device is fully loaded and a running state meets a requirement; and when the related data does not include valid data, reacquire the related data for producing the run size of elements by the production device lot by lot.

Optionally, the elements are semiconductor elements.

Figure 5:
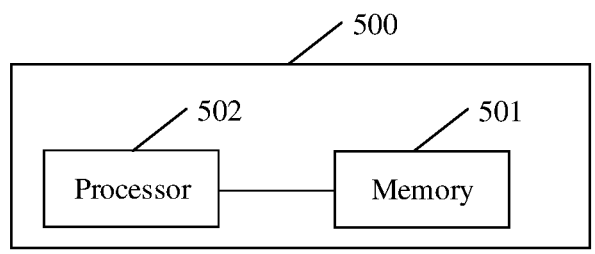
FIG. 5 is a schematic diagram of a device for determining production capacity boundaries according to an embodiment of the present disclosure.

The embodiment of the present disclosure provides a schematic diagram of a device for determining production capacity boundaries 500. A memory 501 and a processor 502 are included, as illustrated in FIG. 5.

The memory 501 is configured to store a computer program.

The processor 502 is configured to read the program in the memory and execute the following operations.

Related data for producing a run size of elements by a production device lot by lot are acquired, and time intervals between production ending time points of adjacent lots are determined according to the related data;

The determined time intervals according to lengths are sorted to obtain a time interval sequence.

Distribution features of time intervals at two boundaries of a present time interval sequence are parsed respectively to determine whether a data removing condition is satisfied, the time intervals at each boundary being time intervals of two extraction step lengths.

When the data removing condition is satisfied, an outlier in the parsed time intervals is determined according to a mean value of the present time interval sequence, the time interval of the extraction step length where the outlier is located is removed, and re-parsing the distribution features of the time intervals at the two boundaries of the present time interval sequence respectively to determine whether the data removing condition is satisfied.

When the data removing condition is not satisfied, production capacity boundaries of the production device are determined according to a minimum time interval and maximum time interval of the present time interval sequence and the run size.

Optionally, the operation that the processor 502 parses the distribution features of the time intervals at the two boundaries of the present time interval sequence respectively to determine whether the data removing condition is satisfied includes the following operations.

Whether the distribution feature of the time intervals of the two extraction step lengths corresponding to each boundary is consistent with a linear functional distribution feature of the present time interval sequence is determined.

When the distribution feature of the time intervals of the two extraction step lengths corresponding to any boundary is inconsistent with the linear functional distribution feature of the present time interval sequence, it is determined that the data removing condition is satisfied.

When the distribution feature of the time intervals of the two extraction step lengths corresponding to each boundary is consistent with the linear functional distribution feature of the present time interval sequence, it is determined that the data removing condition is not satisfied.

Optionally, the operation that the processor 502 determines whether the distribution feature of the time intervals of the two extraction step lengths corresponding to each boundary is consistent with the linear functional distribution feature of the present time interval sequence includes the following operations.

For a first boundary with shorter time intervals, respective minimum time intervals Min1 and Min2 in two extraction step lengths corresponding to the first boundary are determined respectively, Min1 being not greater than Min2;

For a second boundary with longer time intervals, respective maximum time intervals MaxN−1 and MaxN in two extraction step lengths corresponding to the second boundary are determined respectively, MaxN−1 being not greater than MaxN.

When Min2−Min1<$C_0$*σ, it is determined that a distribution feature of the time intervals of the two extraction step lengths corresponding to the first boundary is consistent with the linear functional distribution feature of the present time interval sequence.

When MaxN−MaxN−1<$C_0$*σ, it is determined that a distribution feature of the time intervals of the two extraction step lengths corresponding to the second boundary is consistent with the linear functional distribution feature of the present time interval sequence.

$C_0$ is a preset tolerance coefficient, and a is a standard deviation of the present time interval sequence.

Optionally, the operation that the processor 502 determines the outlier in the parsed time intervals according to the mean value of the present time interval sequence includes the following operations.

Max{|MaxN−μ|, |Min1−μ|} is determined as the outlier in the parsed time intervals.

Herein, μ is the mean value of the present time interval sequence.

Optionally, the extraction step length is a ratio of the total number of time intervals of the present time interval sequence to a preset grouping number N.

Optionally, the operation that the processor 502 determines the production capacity boundaries of the production device according to the minimum time interval and maximum time interval of the present time interval sequence and the run size includes the following operation.

The production capacity boundary WPH∈[Run Size/(M2*MaxN), Run Size/(M1*Min1)] of the production device is determined.

Run Size is the run size, Min1 is the minimum time interval of the present time interval sequence, MaxN is the maximum time interval of the present time interval sequence, M1 is a first preset tolerance coefficient, and M2 is a second preset tolerance coefficient.

Optionally, after acquiring the related data for producing the run size of elements by the production device lot by lot is acquired, the processor 502 is further configured to:

determine whether the related data includes valid data, the valid data being data acquired when the production device is fully loaded and a running state meets a requirement; and when the related data does not include valid data, reacquire the related data for producing the run size of elements by the production device lot by lot.

Optionally, the elements are semiconductor elements.

The present disclosure also provides a computer-readable storage medium, in which a computer program instruction is stored. The computer program instruction is executed by a processor to implement the steps of the method for determining production capacity boundaries provided in embodiment 1.

In some embodiments provided by the present disclosure, it is to be understood that the disclosed system, device and method may be implemented in another manner. For example, the device embodiment described above is only schematic, and for example, division of the modules is only logic function division, and other division manners may be adopted during practical implementation. For example, multiple modules or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the modules, and may be electrical and mechanical or adopt other forms.

The modules described as separate parts may or may not be physically separated, and parts displayed as modules may or may not be physical modules, and namely may be located in the same place, or may also be distributed to multiple network modules. Part or all of the modules may be selected to achieve the purposes of the solutions of the embodiments as practically required.

In addition, each function module in each embodiment of the present disclosure may be integrated into a processing module, each module may also physically exist independently, and two or more than two modules may also be integrated into a module.

The integrated module may be implemented in a hardware form and may also be implemented in form of a software function module. When being implemented in form of software functional module and sold or used as an independent product, the integrated module may be stored in a computer-readable storage medium.

The embodiments may be implemented completely or partially through software, hardware, firmware or any combination thereof. During implementation with the software, the embodiments may be implemented completely or partially in form of a computer program product.

The computer program product includes one or more computer instructions. When the computer program instruction is loaded and executed in a computer, the flows or functions according to the embodiments of the present disclosure are completely or partially generated. The computer may be a universal computer, a dedicated computer, a computer network, or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)), or the like.

The technical solutions provided in the present disclosure are introduced above in detail, the principle and implementations of the present disclosure are elaborated with specific examples in the present disclosure, and the descriptions made to the embodiments are only adopted to help the method of the present disclosure and the core concept thereof to be understood. In addition, those of ordinary skill in the art may make variations to the specific implementations and the present disclosure scope according to the concept of the present disclosure. From the above, the contents of the specification should not be understood as limits to the present disclosure.

Those skilled in the art should know that the embodiment of the present disclosure may be provided as a method, a system or a computer program product. Therefore, the present disclosure may adopt a form of pure hardware embodiment, pure software embodiment or combined software and hardware embodiment. Moreover, the present disclosure may adopt a form of computer program product implemented on one or more computer-available storage media (including, but not limited to, a disk memory, a Compact Disc Read-Only Memory (CD-ROM) and an optical memory) including computer-available program codes.

The present disclosure is described with reference to flowcharts and/or block diagrams of the method, device (system) and computer program product according to the embodiments of the present disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

Although the preferred embodiments of the present disclosure have been described, those skilled in the art, once learning about basic creative concepts, may make other variations and modifications to these embodiments. Therefore, it is intended to explain the appended claims to include the preferred embodiments and all the variations and modifications falling within the scope of the present disclosure.

It is apparent that those skilled in the art may make various modifications and transformations to the embodiments of the present disclosure without departing from the spirit and scope of the embodiments of the present disclosure. Therefore, if these modifications and transformations of the present disclosure fall within the scopes of the claims of the present disclosure and equivalent technologies thereof, the present disclosure is also intended to include these modifications and transformations.

The invention claimed is:

1. A method for determining production capacity boundaries of a semiconductor production device, comprising:
   acquiring related data for producing a run size of semiconductor elements by the semiconductor production device lot by lot, and determining time intervals between production ending time points of adjacent lots according to the related data;
   sorting the determined time intervals according to lengths to obtain a time interval sequence;
   parsing distribution features of time intervals at two boundaries of a present time interval sequence respectively to determine whether a data removing condition is satisfied, the time intervals at each boundary being time intervals of two extraction step lengths;
   when the data removing condition is satisfied, determining an outlier in the parsed time intervals according to a mean value of the present time interval sequence, removing the time interval of the extraction step length where the outlier is located, and re-parsing the distribution features of the time intervals at the two boundaries of the present time interval sequence respectively to determine whether the data removing condition is satisfied; and
   when the data removing condition is not satisfied, determining production capacity boundaries of the semiconductor production device according to a minimum time interval and a maximum time interval of the present time interval sequence and the run size.

2. The method of claim 1, wherein parsing the distribution features of the time intervals at the two boundaries of the present time interval sequence respectively to determine whether the data removing condition is satisfied comprises:
   determining whether the distribution feature of the time intervals of the two extraction step lengths corresponding to each boundary is consistent with a linear functional distribution feature of the present time interval sequence;
   when the distribution feature of the time intervals of the two extraction step lengths corresponding to any boundary is inconsistent with the linear functional distribution feature of the present time interval sequence, determining that the data removing condition is satisfied; and
   when the distribution feature of the time intervals of the two extraction step lengths corresponding to each boundary is consistent with the linear functional distribution feature of the present time interval sequence, determining that the data removing condition is not satisfied.

3. The method of claim 2, wherein determining whether the distribution feature of the time intervals of the two extraction step lengths corresponding to each boundary is consistent with the linear functional distribution feature of the present time interval sequence comprises:
   for a first boundary with shorter time intervals, determining respective minimum time intervals Min1 and Min2 in two extraction step lengths corresponding to the first boundary respectively, Min1 being not greater than Min2;
   for a second boundary with longer time intervals, determining respective maximum time intervals MaxN−1 and MaxN in two extraction step lengths corresponding to the second boundary respectively, MaxN−1 being not greater than MaxN;
   when Min2−Min1<$C_0$*σ, determining that a distribution feature of the time intervals of the two extraction step lengths corresponding to the first boundary is consistent with the linear functional distribution feature of the present time interval sequence; and when MaxN−MaxN−1<$C_0$*σ, determining that a distribution feature of the time intervals of the two extraction step lengths corresponding to the second boundary is consistent with the linear functional distribution feature of the present time interval sequence, N being a preset grouping number, wherein $C_0$ is a preset tolerance coefficient, and a is a standard deviation of the present time interval sequence.

4. The method of claim 3, wherein determining the outlier in the parsed time intervals according to the mean value of the present time interval sequence comprises:

determining max{|MaxN−μ|, |Min1−∥|} as the outlier in the parsed time intervals, wherein μ is the mean value of the present time interval sequence.

5. The method of claim 1, wherein the extraction step length is a ratio of a total number of time intervals of the present time interval sequence to a preset grouping number N.

6. The method of claim 1, wherein determining the production capacity boundaries of the semiconductor production device according to the minimum time interval and the maximum time interval of the present time interval sequence and the run size comprises:

determining the production capacity boundaries WPH∈ [Run Size/(M2*MaxN), Run Size/(M1*Min1)] of the semiconductor production device, wherein Run Size is the run size, Min1 is the minimum time interval of the present time interval sequence, MaxN is the maximum time interval of the present time interval sequence, M1 is a first preset tolerance coefficient, and M2 is a second preset tolerance coefficient.

7. The method of claim 1, wherein after acquiring the related data for producing the run size of semiconductor elements by the semiconductor production device lot by lot, the method further comprises:

determining whether the related data comprises valid data, the valid data being data acquired when the semiconductor production device is fully loaded and a running state meets a requirement; and when the related data does not comprise the valid data, reacquiring the related data for producing the run size of semiconductor elements by the semiconductor production device lot by lot.

8. The method of claim 1, wherein:

the production capacity boundaries of the semiconductor production device are used to determine capacity planning of the semiconductor production device.

9. An apparatus for determining production capacity boundaries of a semiconductor production device, comprising:

a memory for storing processor-executable instructions; and a processor configured to execute the processor-executable instructions to:

acquire related data for producing a run size of semiconductor elements by the semiconductor production device lot by lot, and determine time intervals between production ending time points of adjacent lots according to the related data;

sort the determined time intervals according to lengths to obtain a time interval sequence;

parse distribution features of time intervals at two boundaries of a present time interval sequence respectively to determine whether a data removing condition is satisfied, the time intervals at each boundary being time intervals of two extraction step lengths;

when the data removing condition is satisfied, determine an outlier in the parsed time intervals according to a mean value of the present time interval sequence, remove the time interval of the extraction step length where the outlier is located, and re-parse the distribution features of the time intervals at the two boundaries of the present time interval sequence respectively to determine whether the data removing condition is satisfied; and when the data removing condition is not satisfied, determine production capacity boundaries of the semiconductor production device according to a minimum time interval and a maximum time interval of the present time interval sequence and the run size.

10. The apparatus of claim 9, wherein the processor is configured to execute the processor-executable instructions to:

determine whether the distribution feature of the time intervals of the two extraction step lengths corresponding to each boundary is consistent with a linear functional distribution feature of the present time interval sequence;

when the distribution feature of the time intervals of the two extraction step lengths corresponding to any boundary is inconsistent with the linear functional distribution feature of the present time interval sequence, determine that the data removing condition is satisfied; and when the distribution feature of the time intervals of the two extraction step lengths corresponding to each boundary is consistent with the linear functional distribution feature of the present time interval sequence, determine that the data removing condition is not satisfied.

11. The apparatus of claim 10, wherein the processor is configured to execute the processor-executable instructions to:

for a first boundary with shorter time intervals, determine respective minimum time intervals Min1 and Min2 in two extraction step lengths corresponding to the first boundary respectively, Min1 being not greater than Min2;

for a second boundary with longer time intervals, determine respective maximum time intervals MaxN−1 and MaxN in two extraction step lengths corresponding to the second boundary respectively, MaxN−1 being not greater than MaxN;

when Min2−Min1<$C_0$*σ, determine that a distribution feature of the time intervals of the two extraction step lengths corresponding to the first boundary is consistent with the linear functional distribution feature of the present time interval sequence; and when MaxN−MaxN−1<$C_0$*σ, determine that a distribution feature of the time intervals of the two extraction step lengths corresponding to the second boundary is consistent with the linear functional distribution feature of the present time interval sequence, N being a preset grouping number, wherein $C_0$ is a preset tolerance coefficient, and σ is a standard deviation of the present time interval sequence.

12. The apparatus of claim 11, wherein the processor is configured to execute the processor-executable instructions to:
determine max{|MaxN−μ|, Min1−μ|} as the outlier in the parsed time intervals,
wherein μ the mean value of the present time interval sequence.

13. The apparatus of claim 9, wherein the extraction step length is a ratio of a total number of time intervals of the present time interval sequence to a preset grouping number N.

14. The apparatus of claim 9, wherein the processor is configured to execute the processor-executable instructions to:
determine the production capacity boundaries WPH∈ [Run Size/(M2*MaxN), Run Size/(M1*Min1)] of the semiconductor production device,
wherein Run Size is the run size, Min1 is the minimum time interval of the present time interval sequence, MaxN is the maximum time interval of the present time interval sequence, M1 is a first preset tolerance coefficient, and M2 is a second preset tolerance coefficient.

15. The apparatus of claim 9, wherein the processor is configured to execute the processor-executable instructions to:
after acquiring the related data for producing the run size of semiconductor elements by the semiconductor production device lot by lot, determine whether the related data comprises valid data, the valid data being data acquired when the semiconductor production device is fully loaded and a running state meets a requirement; and
when the related data does not comprise the valid data, reacquire the related data for producing the run size of semiconductor elements by the semiconductor production device lot by lot.

16. A non-transitory computer-readable storage medium having stored a computer program instruction that when executed by a processor, implements steps of a method for determining production capacity boundaries of a semiconductor production device, the method comprising:
acquiring related data for producing a run size of semiconductor elements by the semiconductor production device lot by lot, and determining time intervals between production ending time points of adjacent lots according to the related data;
sorting the determined time intervals according to lengths to obtain a time interval sequence;
parsing distribution features of time intervals at two boundaries of a present time interval sequence respectively to determine whether a data removing condition is satisfied, the time intervals at each boundary being time intervals of two extraction step lengths;
when the data removing condition is satisfied, determining an outlier in the parsed time intervals according to a mean value of the present time interval sequence, removing the time interval of the extraction step length where the outlier is located, and re-parsing the distribution features of the time intervals at the two boundaries of the present time interval sequence respectively to determine whether the data removing condition is satisfied; and
when the data removing condition is not satisfied, determining production capacity boundaries of the semiconductor production device according to a minimum time interval and a maximum time interval of the present time interval sequence and the run size.

17. The non-transitory computer-readable storage medium of claim 16, wherein parsing the distribution features of the time intervals at the two boundaries of the present time interval sequence respectively to determine whether the data removing condition is satisfied comprises:
determining whether the distribution feature of the time intervals of the two extraction step lengths corresponding to each boundary is consistent with a linear functional distribution feature of the present time interval sequence;
when the distribution feature of the time intervals of the two extraction step lengths corresponding to any boundary is inconsistent with the linear functional distribution feature of the present time interval sequence, determining that the data removing condition is satisfied; and
when the distribution feature of the time intervals of the two extraction step lengths corresponding to each boundary is consistent with the linear functional distribution feature of the present time interval sequence, determining that the data removing condition is not satisfied.

18. The non-transitory computer-readable storage medium of claim 17, wherein determining whether the distribution feature of the time intervals of the two extraction step lengths corresponding to each boundary is consistent with the linear functional distribution feature of the present time interval sequence comprises:
for a first boundary with shorter time intervals, determining respective minimum time intervals Min1 and Min2 in two extraction step lengths corresponding to the first boundary respectively, Min1 being not greater than Min2;
for a second boundary with longer time intervals, determining respective maximum time intervals MaxN−1 and MaxN in two extraction step lengths corresponding to the second boundary respectively, MaxN−1 being not greater than MaxN;
when Min2−Min1<$C_0$*σ, determining that a distribution feature of the time intervals of the two extraction step lengths corresponding to the first boundary is consistent with the linear functional distribution feature of the present time interval sequence; and
when MaxN−MaxN−1<$C_0$*σ, determining that a distribution feature of the time intervals of the two extraction step lengths corresponding to the second boundary is consistent with the linear functional distribution feature of the present time interval sequence, N being a preset grouping number,
wherein $C_0$ is a preset tolerance coefficient, and a is a standard deviation of the present time interval sequence.

19. The non-transitory computer-readable storage medium of claim 18, wherein determining the outlier in the parsed time intervals according to the mean value of the present time interval sequence comprises:
determining max{|MaxN−μ|, |Min1−μ∥} as the outlier in the parsed time intervals,
wherein μ is the mean value of the present time interval sequence.

20. The apparatus of claim 9, wherein:
the production capacity boundaries of the semiconductor production device are used to determine capacity planning of the semiconductor production device.

* * * * *